March 20, 1956 W. A. CHRISTIANSON ET AL 2,738,779
LIQUID AND GAS SEPARATION AND BLOWER MEANS
Filed Dec. 29, 1952 3 Sheets-Sheet 1

Inventors
Wallace A. Christianson, &
By Joseph P. Miller
Willits, Helmig & Baillio
Attorneys March 20, 1956    W. A. CHRISTIANSON ET AL    2,738,779
LIQUID AND GAS SEPARATION AND BLOWER MEANS
Filed Dec. 29, 1952      3 Sheets-Sheet 2

Inventors
Wallace A. Christianson, &
Joseph P. Miller
By Willits, Helmig & Baillio
Attorneys March 20, 1956    W. A. CHRISTIANSON ET AL    2,738,779
LIQUID AND GAS SEPARATION AND BLOWER MEANS
Filed Dec. 29, 1952    3 Sheets-Sheet 3

Inventors
Wallace A. Christianson, &
By Joseph P. Miller
Willits, Helmig & Baillio
Attorneys

United States Patent Office 2,738,779
Patented Mar. 20, 1956

2,738,779

LIQUID AND GAS SEPARATION AND BLOWER MEANS

Wallace A. Christianson, Lisle, and Joseph P. Miller, Hinsdale, Ill., assignors to General Motors Corporation, Detroit, Mich., a corporation of Delaware Application December 29, 1952, Serial No. 328,466

18 Claims. (Cl. 123—41.86)

This invention relates generally to liquid and gas separation means and more particularly to centrifugal blowers adapted to include oil and air separation means for ventilating the crankcase and gear housing of an internal combustion engine.

The situation often arises in which liquid for one reason or another is suspended in a gaseous fluid, making it necessary to provide some means for removing this liquid from the gaseous fluid. This problem is acutely present in diesel engines wherein the crankcase contains a large amount of oil and the air contained in the crankcase becomes highly saturated with small oil particles. Since it is the usual practice to provide means for ventilating the engine crankcase, unless the oil is removed from the air before the crankcase is ventilated, the oil will be lost. In order to prevent the loss of this oil, various types of oil separating means have been devised, none of which have proven entirely satisfactory. This invention, therefore, seeks to overcome the objections to the oil separators now in use by very slightly alternating certain blower structure which is necessary in the efficient operation of a diesel or other type of internal combustion engine.

This invention will be described in combination with the centrifugal blower of a diesel engine as used on a diesel electric locomotive. It may be readily appreciated as the description proceeds, however, that this new liquid and gas separation means need not be limited to use with an internal combusition engine or any particular device since it will prove adaptable whenever it is necessary to separate liquid particles from gaseous fluids.

It, therefore, becomes an object of this invention to provide a unique structure for the separation of liquids from gaseous fluids.

It is a further object of this invention to provide unique oil and air separation means in combination with a centrifugal blower for an internal combustion engine.

It is a further object of this invention to provide crankcase and gear housing ventilating means for an internal combustion engine.

It is another object of this invention to provide a centrifugal blower for an internal combustion engine having oil and air separation means incorporated therein for ventilating the crankcase and gear housing of an internal combustion engine.

Figure 1:
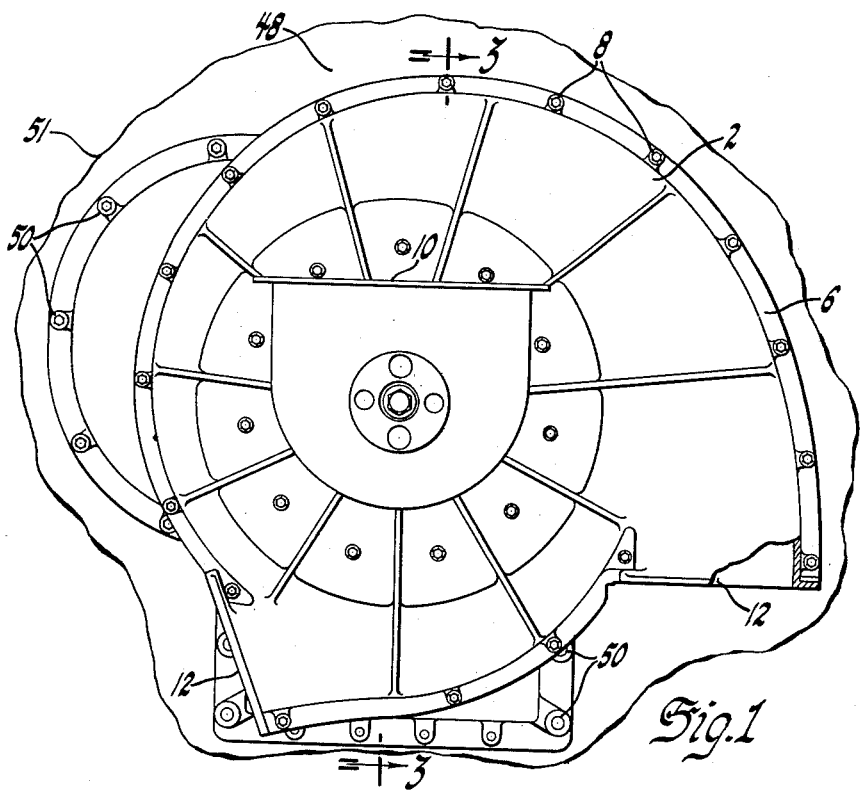
Figure 1 is an exterior view of a centrifugal blower attached to the timing gear housing of an internal combustion engine.
Figure 3:
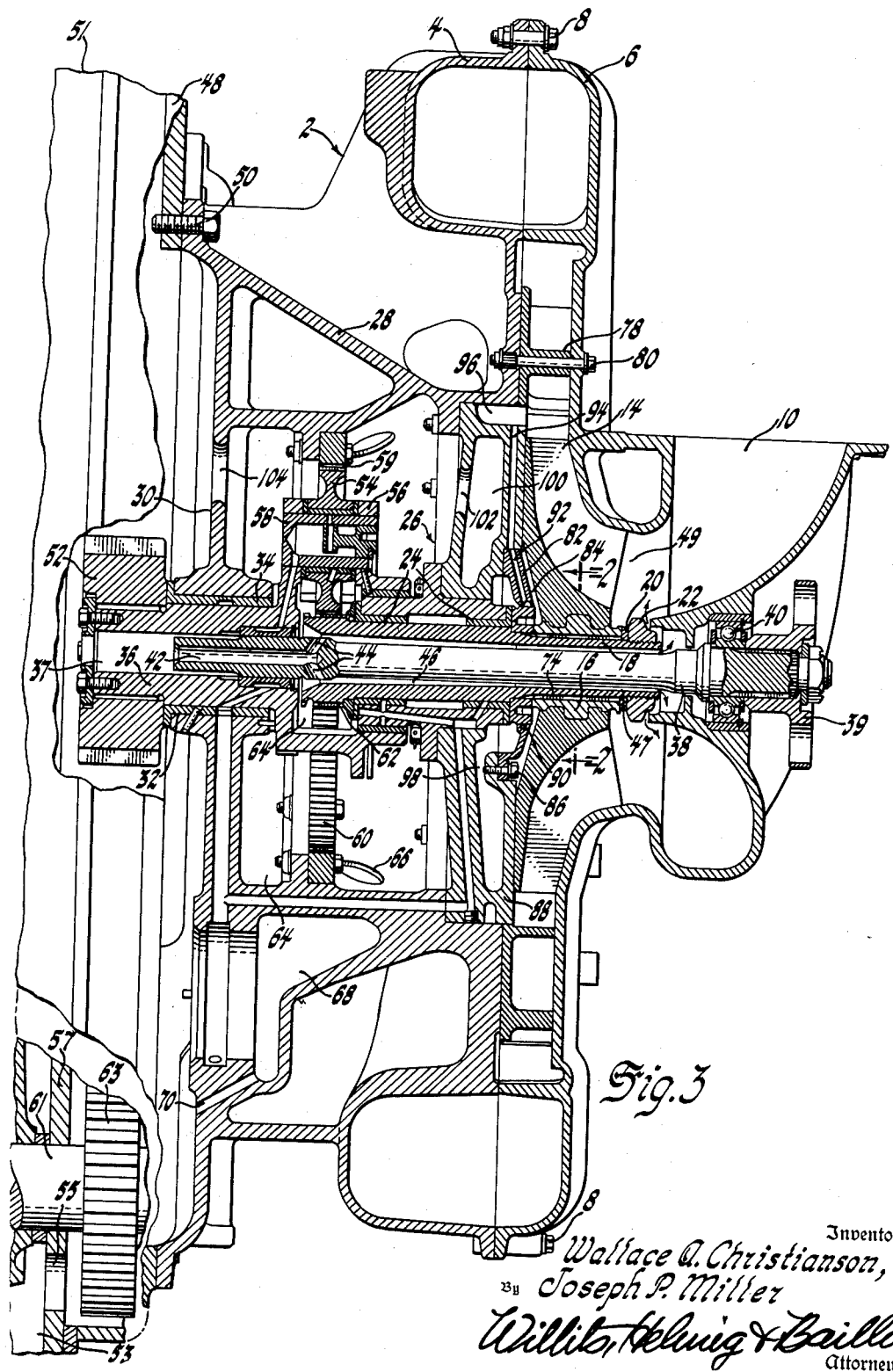
Figure 3 is a full sectional view of the centrifugal blower showing the details thereof and is taken along line 3—3 of Figure 1.
Figure 4:
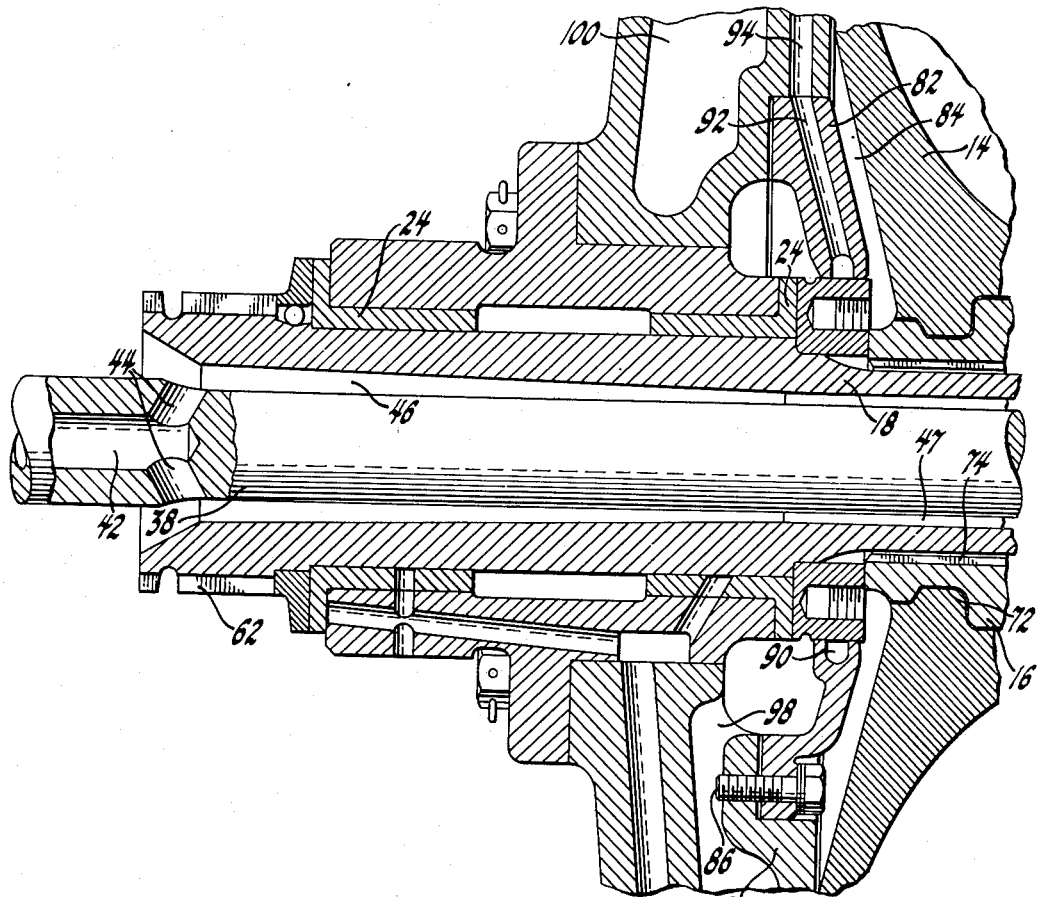
Figure 4 is an enlarged showing of part of Figure 3 and is presented to more clearly illustrate the unique liquid and gas separating means.

Referring now to the accompanying drawings, a centrifugal blower housing 2 having a scroll collector is shown. This housing is made up of two sections 4 and 6 respectively, which are fastened together by bolt assemblies 8 to form the scroll collector of the blower 2. The inlet of the blower is indicated by the numeral 10 and its outlets by the numerals 12 as best seen in Figures 1 and 3. Contained within the housing 2 is an impeller 14 which is formed about a hexagonal hub 16 splined to a hollow impeller shaft 18. The impeller 14 is secured axially on the shaft by means of a washer 20 and a nut 22 which is adapted to engage threads on the end of the hollow impeller shaft 18. The impeller shaft 18 is supported for rotation in a pair of bearing bushings 24 pressed into a built-up section of the blower housing indicated geenrally by the numeral 26. The built-up section 26 is fastened to a webbing structure 28 which is integrally formed with and contained within the section 4 of the housing 2.

A vertical wall 30 of the section 4 of the blower housing 2 is provided with a centrally located hole containing a bearing bushing 34 which rotatably supports a planet carrier shaft 36 having an axial passage 37 extending therethrough. Supported within the axial passage 37 of the planet carrier shaft 36 is one end of a driving shaft 38 which is used to drive the auxiliary generator for the locomotive by means of a flange coupling 39. The driving shaft 38 extends through the hollow impeller shaft 18 and is rotatably supported at its other end by the ball bearing 40 recessed in that portion of section 6 of the housing 2 forming the blower inlet 10. The shaft 38 is provided with an axial passage 42 which communicates at one end with the axial passage 37 contained in the planet carrier shaft 36, and at its other end with radial passages 44 extending to the outer surface of the driving shaft 38. The internal surface of the hollow impeller shaft 18 is provided with a taper extending along a substantial portion of the shaft length to form an annular tapered clearance passage 46 with the outer surface of the shaft 38. The annular tapered passage 46 formed by the inner surface of the shaft 18 and the outer surface of the shaft 38 extends into a uniform annular clearance passage 47 communicating with the eye 49 of the impeller as shown in Figure 3 by the curved arrows located at the right hand end of the hollow shaft 18.

The blower housing 2 is suitably attached to the timing housing 48 of an internal combustion engine 51 by means of bolts 50. The timing gear housing 48 is fastened to one end of the internal combustion engine 51 so that it communicates with the interior of the crankcase 53 by means of a passage 55 located in the end crankcase wall 57 near the lower end of the timing gear housing. The engine crankshaft 61 is shown extending through the end crankcase wall 57 with the timing gear 63 attached thereto.

With the centrifgual blower properly secured to the timing gear housing 48 a driving gear 52 meshes with a suitable gear in the timing gear housing. Rotation of the hollow impeller shaft 18 is accomplished through the driving gear 52 secured to the planet carrier shaft 36 which in turn carries a planet gear 54 on the planet carrier 56 by means of the planet gear shaft 58. As the planet carrier 56 revolves it causes the teeth 59 on the planet gear 54 to walk around the inside of an annular ring gear 60. The teeth 59 of the planet gear 54 also engage teeth 62 provided on the hollow shaft 18 to thereby cause it to turn. Since one end of the shaft 38 is secured by splines or other suitable means within the hollow portion of the planet carrier shaft 36 it will be directly rotated thereby at the same angular velocity. Thus it may be seen that the rotations of the two shafts 18 and 38 are in the same direction but at different speeds.

The operation of the oil and air separating means is as follows: Due to silencer and air filter means usually employed in the impeller inlet scroll and due to the velocity of the air at the eye of the impeller a reduction of pressure takes place in the annular clearances 46 and 47 and, therefore, pressure contained in the crankcase induces oil vapor to flow into the passage 37 through passage 42, the radial passages 44 and the tapered clearance 46. Because of the rotational velocity of the two shafts 18 and 38 the oil contained in the air, by reason of its heavier weight, is centrifuged to the inner tapered surface of the hollow impeller shaft 18. As the oil impinges upon this tapered surface it is given a component of force created by centrifugal force acting thereon which tends to move the oil along the tapered surface toward the enlarged end of the annular tapered passage 46. The oil is collected from this enlarged end of the tapered passage in a chamber 64 located at the enlarged open end of the hollow shaft 18. The oil then passes from the chamber 64 to an oil drain hole 66 into a second chamber 68. The oil exits from the chamber 68 by means of an oil passage 70 which leads into the timing gear housing 48 and the oil then passes into the crankcase. The air which has had the oil removed therefrom continues to flow along the outer surface of the shaft 38 toward the impeller eye 49, where it is taken up by the impeller and driven to the scroll outlets.

Figure 2:
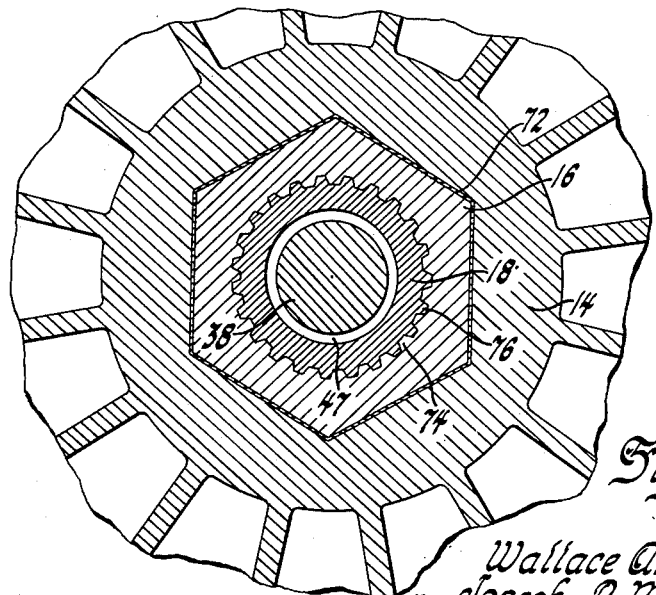
Figure 2 is a full sectional view taken along the line 2—2 of Figure 3 and shows the hexagonal configuration of the impeller hub and its manner of attachment to the aluminum portion of the impeller and its driving shaft.

Another feature of this centrifugal blower is more clearly illustrated in Figure 2 in which it may be noted that the steel hub 16 about which the impeller blades are formed is hexagonal in shape. Separating the steel hub 16 and the aluminum impeller casting is a thin coating 72 of zinc whose surfaces are contiguous with the contacting surfaces of the aluminum impeller casting and the steel hub. As has already been described the hub 16 is provided with splines 74 which engage mating splines 76 on the hollow shaft 18. By using a hexagonal hub of relatively large cross-section not only is a positive drive given to the impeller casting 14 but the strength of the entire impeller assembly is increased considerably. The strength is increased for the reason that aluminum impellers are generally cast, and this casting creates a large amount of porosity around the center portion of the casting. By providing the hexagonal hub 16 the cast section of the impeller is reduced, thereby creating less porosity and a stronger rotor because of this smaller amount of porosity.

Another unique feature of the centrifugal blower is shown in Figure 3 and consists of a removable diffuser 78 which is fastened to sections 4 and 6 of the blower housing 2 by means of bolt assemblies 80. By providing a diffuser which may be easily removed, other diffusers incorporating the same fastening methods may be substituted for the diffuser 78 to adapt the blower for engines requiring different air flow capacities. This substitution may be made simply by removing the section 6 of the blower housing along with shaft 38, inserting another diffuser having different directing characteristics, and reassembling the blower section 6.

This new blower assembly also provides for an air pressure seal 82 immediately adacent the impeller which will prevent oil vapor from finding its way into the impeller chamber 84. The air seal 82 is maintained in position within the blower housing by means of bolts 86 which fasten it to suitable webbing construction 88 contained within the housing 2. The air pressure oil seal 82 is provided with a small annular chamber 90 which communicates by passage 92 in the oil seal with a passage 94 in the webing 88. The passage 94 in the webbing 88 in turn communicates with a pocket 96 which is supplied with air on the high pressure side of the impeller 14. The air pressure on the high pressure side of the impeller is thereby communicated by means of the pocket 96 and passages 94 and 92 to the small annular chamber 90 to thereby prevent the entrance of any oil impregnated air from the engine side of the impeller into the rotor chamber 84. The high pressure air which may escape from the oil seal can pass to the engine crankcase by means of the cored hole 98 leading into the chamber 100 and the cored holes 102 and 104 which connect chamber 100 with the interior of the timing gear housing and the crankcase.

We claim:

1. Liquid and gas separation means comprising a pair of concentric surfaces positioned to form an annular passage between said surfaces having an entrance and an outlet at opposite axially spaced ends thereof, means to rotate the inner of said surfaces relative to the outer of said surfaces, means to induce liquid carrying gas into said entrance and through said passage axially toward said outlet, and means to remove liquid from the entrance of said passage centrifuged to said outer surface by rotation of said inner surface.

2. Liquid and gas separation means comprising an inwardly facing tapered surface and an outwardly facing cylindrical surface, said outwardly facing surface being contained within said inwardly facing surface, said surfaces forming an annular clearance therebetween, means to rotate said outwardly facing surface relative to said inwardly facing surface, pressure differential means to induce liquid carrying gas into said annular clearance at one end thereof, means to remove liquid from the one end of said annular clearance centrifuged to said inwardly facing surface by rotation of said outwardly facing surface, and means to remove gas having liquid centrifuged therefrom from the other end of said annular clearance.

3. A liquid and vapor separator comprising a cylindrical shaft extending into a housing having an inner surface which forms a substantially horizontal tapered bore therein, means to turn said shaft, means to induce liquid carrying vapor into said bore and around the outer surface of said shaft and in the direction of diminishing taper, and means to remove liquid centrifuged by shaft rotation to the surface forming said bore in said housing from said bore in the direction of increasing taper.

4. A liquid and gas separator comprising an outer shaft having an inner surface forming a tapered bore therein, an inner cylindrical shaft extending into said bore to form an annular tapered clearance between the outer surface of said inner shaft and the inner surface of said outer shaft forming said bore, means to turn said shafts, pressure differential means to induce liquid carrying gas into said annular clearance in the direction of taper, and means located adjacent the inner surface of said outer shaft and removed from the small end of said tapered clearance in the direction opposite to the taper of said bore to remove liquid centrifuged to the inner surface forming said bore.

5. A liquid and gas separator comprising a pair of concentric shafts, means to rotate the inner of said shafts for relative movement with respect to the outer of said shafts, the outer of said shafts having an inner surface forming a tapered bore through which the inner of said shafts extends, means to induce liquid carrying vapor into said tapered bore and around said inner shaft for centrifuging the liquid carried by said vapor to the inner surface of said outer shaft forming said tapered bore, said inner surface having means leading therefrom for removing liquid centrifuged thereto by rotation of the inner of said shafts.

6. Gas and liquid separation means including an outer shaft having an internal surface forming a tapered bore therein, a cylindrical inner shaft extending into said bore and forming a tapered annular clearance between the outer surface of said inner shaft and the inner surface of said outer shaft, means to rotate said shafts in the same direction and at different relative speeds, means to induce liquid carrying gas into said tapered annular clearance between said shafts, and means to remove liquid from said tapered surface which has been centrifuged to said tapered surface by rotation of said shafts.

7. Oil an air separation means including an outer shaft having a tapered bore therein, an inner cylindrical shaft extending into said tapered bore whose outer surface forms an annular tapered passage with the inner surface forming said bore in said outer shaft, means to rotate said shafts relative to each other, means to induce oil impregnated air through said passage, and means to remove oil centrifuged to said inner surface from a point on said inner surface to which liquid has flowed due to the centrifugal forces acting thereon.

8. A centrifugal blower for an internal combustion engine, a crankcase for an internal combustion engine, means to fasten said blower housing to said crankcase, said blower having an impeller rigidly attached to a hollow shaft and adapted to be rotated thereby, said hollow shaft being provided with an inner surface forming an internal tapering bore, an inner driving shaft extending through said tapered bore and having an outwardly facing cylindrical surface forming an annular tapered passage with the surface forming said tapered bore, said inner shaft having an axial passage communicating at one end with the interior of said crankcase and at the other with said annular tapered passage, said annular tapered passage communicating with the eye of said impeller to create a pressure differential between the pressure in said crankcase and in said tapered passage to thereby induce oil impregnated air into said tapered passage from said crankcase, and means to turn said inner shaft relative to said hollow shaft, and means communicating with the large end of said tapered passage to collect oil which has been thrown to the inner surface of said tapered shaft and caused to flow therealong by centrifugal forces created by the relative rotation of said shafts.

9. Ventilating means for an internal combustion engine comprising an engine crankcase having a blower assembly attached thereto, hollow shafting means for driving a rotor of said blower, auxiliary drive shafting means extending through said hollow shafting means and forming an annular passage therewith, one end of said passage communicating with the interior of said crankcase and the other end of said passage communicating with the inlet of said blower.

10. Crankcase ventilating means for an internal combustion engine comprising a blower attached to an engine crankcase, said blower including a pair of concentric rotatable shafts forming an annular passage therebetween, one of said shafts being adapted to drive said blower, the other of said shafts being adapted to drive auxiliary means, one end of said passage communicating with the interior of said crankcase and the other end of said passage communicating with the inlet of said blower.

11. Crankcase and timing gear housing ventilating means for an internal combustion engine comprising a centrifugal blower assembly attached to an engine timing gear housing, said blower assembly including a pair of concentric rotatable shafts forming an annular passage therebetween, an impeller for said blower assembly attached to the outer of said shafts for rotation thereby, the other of said shafts having auxiliary means attached thereto for rotation thereby, one end of said passage communicating with the interior of said timing gear housing and the other end of said passage communicating with the air inlet of said blower assembly.

12. Crankcase ventilating means for an internal combustion engine comprising a pair of concentric surfaces forming an annular passage therebetween, one end of said annular passage communicating with an engine crankcase, the other end of said passage communicating with the inlet of a centrifugal blower, means to rotate the inner of said surfaces relative to the outer of said surfaces, means to induce oil impregnated air in said crankcase through said passage, said means including a rotatable impeller adapted to reduce the pressure at the point where said passage communicates with the inlet of said blower below the pressure contained in said crankcase, and means to remove oil from said outer surface centrifuged thereto by rotation of said inner surface.

13. Crankcase and timing gear housing ventilating means for an internal combustion engine comprising a centrifugal blower including a pair of concentric shafts rotatable at different speeds relative to each other and in the same direction, the outer of said shafts having a tapered bore through which the inner of said shafts extends to form a tapered annular passage, the large end of said passage communicating with an engine crankcase and an engine timing gear housing and the small end of said passage communicating with the inlet of said centrifugal blower, means to induce oil impregnated air contained in said crankcase into said tapered annular passage, said means including an impeller rotatable by the outer of said shaft, said impeller during rotation adapted to reduce the pressure at the inlet of said blower below the pressure contained in said housings, and pocket means located at the large end of said tapered annular passage to collect oil centrifuged thereto by rotation of said shafts.

14. Engine crankcase ventilating means for an internal combustion engine comprising a centrifugal blower attached to an engine crankcase, said blower having a shaft for driving the impeller of said blower, said shaft having an internal surface forming a tapered bore along the axis of said shaft, a second shaft for driving auxiliary means, said second shaft extending through said tapered bore and having an outer surface which forms an annular tapered passage with the internal surface forming said tapered bore, the large end of said annular tapered passage communicating with said crankcase and the small end of said tapered passage communicating with the inlet of said blower, means to rotate said shafts relative to each other, pressure differential means for inducing oil vapor contained in said crankcase into said passage and including said impeller rotatable by the outer of said shafts to reduce the pressure below the pressure contained in said crankcase, and pocket containing means communicating with said crankcase for collecting oil centrifuged to the inner tapered surface of said outer shaft by relative rotation of said shafts.

15. Crankcase ventilating and oil and air separating means for an internal combustion engine comprising a crankcase having a centrifugal blower attached thereto, said centrifugal blower having a rotor secured to a first rotatable driving shaft having a tapered bore extending axially therethrough, a second rotatable auxiliary driving shaft extending through said tapered bore whose outer surface forms a tapered annular passage with the inner surface of said first driving shaft, the large end of said tapered passage communicating with the interior of said crankcase and the small end of said tapered annular passage communicating with the inlet of said blower, means to rotate said shafts in the same direction at different speeds relative to each other, pressure differential means to cause oil vapor contained in said crankcase to flow through said annular tapered passage, said pressure differential means including said rotor which is adapted to impart velocity to the air entering said blower to reduce the pressure at the inlet of said blower below the pressure contained in said crankcase, and collecting means located at the large end of said tapered annular passage and communicating with said crankcase for returning oil thereto which is centrifuged to the inner surface of said first shaft by rotation of said shafts.

16. Ventilation means for an internal combustion engine comprising an engine crankcase housing, a timing gear housing secured to said crankcase housing and communicating therewith, a centrifugal blower secured to said timing gear housing, said blower having bearing means to rotatably support a hollow driving shaft having a blower rotor splined thereto, planetary gear train means for driving said hollow shaft and said rotor, and an auxiliary driving shaft extending through said hollow shaft and forming an annular passage therewith, said auxiliary driving shaft being driven by drive gear means contained within said timing gear housing, said drive gear means also driving said planetary gear train means to cause rotation of said shafts in the same direction and at different relative speeds with respect to each other, one end of said annular passage communicating through a passage in said drive gear means with the interior of said crankcase housing and said timing gear housing and the other end of said annular passage communicating with the air inlet eye of said blower.

17. Ventilation and oil separation means for an internal combustion engine comprising a crankcase housing having a timing gear housing securely fastened thereto, a centrifugal blower assembly attached to said timing gear housing, an outer driving shaft having a blower rotor splined to said shaft, said shaft having an inner surface forming a tapered bore extending axially along the inside of said shaft for a portion of its length and forming a cylindrical bore extending axially for the remaining portion of its length, an inner auxiliary driving shaft having an outer cylindrical surface forming a tapered passage with the part of the inner surface of said outer shaft forming said tapered bore, said outer cylindrical surface forming an annular clearance of uniform cross-section with the inner surface of said outer shaft forming said cylindrical bore, means to drive said outer shaft including driving gear means contained in said timing gear housing, planetary gear train means geared to drive said outer shaft and driven by said gear driving means, means to drive said inner shaft including said driving gear means being operably connected to said inner shaft, said means to drive said shafts rotating said shafts in the same direction and at different speeds relative to each other, said inner shaft containing at its one end an inner axial passage, one end of said inner axial passage communicating with the interior of said timing gear housing and said crankcase housing and the other end of said inner passage communicating with radial passages which lead to said outer surface of said auxiliary driving shaft and the large end of said tapered annular passage formed by the outer surface of said inner auxiliary driving shaft and the inner surface of said outer shaft, one end of said annular clearance communicating with the air inlet eye of said blower and impeller, pressure differential means to induce oil impregnated air from said crankcase and timing gear housings through the inner axial passage in said auxiliary driving shaft and into said annular tapered passage, said differential pressure means including said rotor rotatable to reduce the pressure at the air inlet eye of said blower below the pressure contained in said timing gear housing and said crankcase housing, an oil collecting pocket located at the large end of said annular tapered passage and communicating therewith to collect oil centrifuged thereto by the rotation of said shafts, and conducting means for returning the oil in said pocket to said timing gear and said crankcase housings.

18. Crankcase ventilating means for an internal combustion engine comprising a blower attached to an engine crankcase for charging said engine, said blower having an inlet in direct communication with the atmosphere, and a drive shaft for said blower having an axially extending passage, one end of said passage being in communication with the interior of said crankcase, the other end of said passage being in communication with the inlet of said blower.

References Cited in the file of this patent

UNITED STATES PATENTS

| | | |
|---|---|---|
| 825,297 | Brunck | July 10, 1906 |
| 866,844 | Cottrell | Sept. 24, 1907 |
| 1,865,425 | Bartling | July 5, 1932 |
| 2,027,819 | Gregg | Jan. 14, 1936 |
| 2,389,130 | Boizard | Nov. 20, 1945 |
| 2,425,410 | Zeitlin et al. | Aug. 12, 1947 |

FOREIGN PATENTS

| | | |
|---|---|---|
| 929,914 | France | Jan. 12, 1948 |